United States Patent Office 3,538,197
Patented Nov. 3, 1970

3,538,197
PRODUCTION OF PHOSPHORIC ACID
DIALKYL ESTERS
Wolfgang Vilsmeier, Bad Durkheim, Germany, assignor to Badische Anilin- & Soda-Fabrik Aktiengesellschaft, Ludwigshafen (Rhine), Germany
No Drawing. Filed July 10, 1967, Ser. No. 652,039
Claims priority, application Germany, July 16, 1966, 1,272,283
Int. Cl. C07f 9/08; C08f 45/58
U.S. Cl. 260—975                  4 Claims

ABSTRACT OF THE DISCLOSURE

Production of dialkyl phosphates by reacting alcohols with phosphorus oxychloride at a temperature of from −30° C. to +10° C. in the presence of a Lewis acid followed by hydrolysis of the tetraalkyl pyrophosphate to the dialkyl phosphate. The tetraalkyl pyrophosphates are insecticides, and the dialkyl phosphates are suitable for use as flame retardants, adhesion promotors for lacquers, as low-froth detergents or as pickling agents for metals.

The reaction of phosphorus oxychloride with alcohols is known to result in a reaction mixture which inter alia contains trialkyl phosphates, phosphoric dialkyl ester chlorides, phosphoric monoalkyl ester dichlorides and tetraalkyl pyrophosphates. It has been stated that trialkyl phosphates can be obtained in good yields by suitable choice of the reaction conditions, but it was not known how the reaction could be directed so that high yields of phosphoric dialkyl ester chlorides or tetraalkyl pyrophosphates would be formed which could be converted by hydrolysis in a simple manner into the industrially important dialkyl phosphates.

According to German patent specification No. 905,368, trialkyl phosphates are obtained in high purity by reaction of phosphorus oxychloride with alcohols in the presence of boron fluoride at +15° to +35° C.

On the other hand tetraalkyl pyrophosphate is obtained according to U.S. patent specification No. 2,552,326 when phosphorus oxychloride is united with alcohols at low temperature, for example below 10° C., and then heated to 130° to 150° C. A mixture of trialkyl phosphate and dialkyl phosphorus oxychloride is first formed at low temperature and this is converted into tetraalkyl pyrophosphates by heating to 130° to 150° C.

It is an object of the present invention to provide a process which will give good yields of tetraalkyl pyrophosphates in a simple reaction without the byproducts mentioned above being formed to an appreciable extent.

Another object of the invention is the hydrolysis of the tetraalkyl pyrophosphate to dialkyl phosphate either after distillation or in the reaction mixture.

These objects are achieved in an advantageous manner in accordance with the process of the present invention by reacting phosphorus oxychloride with an alcohol in the presence of a Lewis acid at a temperature of from −30° C. to +10° C. to form the tetraalkyl pyrophosphate and hydrolyzing this intermediate to form the dialkyl phosphate.

The reaction according to the invention proceeds according to the following equations:

$$2POCl_3 + 5ROH \rightarrow (RO)_4P_2O_3 + 5HCl + RCl$$

$$(RO)_4P_2O_3 + H_2O \rightarrow 2(RO)_2POOH$$

(R denoting an alkyl group).

It is surprising that by using Lewis acids as catalysts at a low reaction temperature, the reaction can be directed almost exclusively toward tetraalkyl pyrophosphates and that the latter may be easily converted into the dialkyl phosphates by hydrolysis. Synthesis of the dialkyl esters is thus achieved with a high yield with reference to phosphorus oxychloride which has not hitherto been reached.

Monoalcohols or dialcohols are in general suitable alcohols for the process. It is preferred to use primary or secondary alcohols. Aliphatic monoalcohols, having one to twelve carbon atoms, preferably secondary alcohols, such as isopropanol, isobutanol and isoamyl alcohol are particularly suitable. Examples of other suitable alcohols are methanol, ethanol, n-propanol, n-butanol, 2-ethylhexanol, decanol, dodecyl alcohol, 1,2-ethylene glycol and 1,2-propylene glycol.

Phosphorus oxychloride and alcohol are in general used in a molar ratio of from 1:2 to 1:6, preferably from 1:4 to 1:5.

The catalysts used for the reaction are Lewis acids, such as aluminum chloride, iron(III) chloride, zinc chloride or preferably boron fluoride. The catalyst need only be used in a small amount, for example 0.1 to 5%, preferably 0.5 to 1%, by weight based on phosphorus oxychloride.

The reaction takes place at temperatures below +10° C. but in general not below −30° C. It is advantageous to use temperatures of from 0° to −20° C. At higher temperatures the reaction proceeds increasingly toward the trialkyl phosphate, and at lower temperatures the reaction rate is extremely low.

To carry out the reaction, the reactants are brought together at the desired reaction temperature below +10° C. It is advantageous to place the alcohol and catalyst in a reactor and to slowly add phosphorus oxychloride. The whole is allowed to continue reacting for some time at the reaction temperature, for example one to one hundred hours, and the product is worked up. To isolate the pyrophosphate in pure form it is advisable not to heat the reaction mixture at temperatures above +10° C. for a long time because otherwise secondary reactions take place. It is advantageous to neutralize the hydrogen chloride formed at temperatures below 10° C., preferably below 0° C. Ammonia has proved to be best as the neutralizing agent. The ammonium chloride formed is then separated by washing with water and the pyrophosphate is purified by distillation at subatmospheric pressure.

The hydrolysis of the pyrophosphate to dialkyl phosphate is carried out in the conventional manner by heating with an excess of water. It is advantageous to maintain an acid reaction in the hydrolysis mixture, for example by adding small amounts of hydrochloric acid.

It is however by no means necessary in the process according to this invention to isolate the pyrophosphate from the reaction mixture and to hydrolyze it in a second stage. Excellent yields are also obtained when the crude reaction mixture has water added to it and is heated for some time. In general 1 to 100 moles, preferably 30 to 40 moles, of water is used per mole of pyrophosphate and hydrolysis is carried out at 20° to 100° C. with residence times of from one to two hours. The product may be worked up by separating the aqueous phase and removing residues of water and alcohol present in the organic phase by distillation under subatmospheric pressure. The dialkyl phosphate obtained is very pure.

Tetraalkyl pyrophosphates are valuable insecticides, and dialkyl phosphates are suitable for use as flame retardants, adhesion promotors for lacquers, as low-froth detergents or as pickling agents for metals.

The invention is illustrated by the following examples.

EXAMPLE 1

500 g. of phosphorous oxychloride is added to 560 g. of isobutanol and 4 g. of boron fluoride at −5° C. in a 2-liter flask and the whole is stirred for sixty hours at −5° C. Neutralization is carried out with ammonia gas at −5° C., the whole is stirred three times, each time with 1000 g. of water and the organic phase is distilled at 140° C. (2 mm.). The yield is 590 g. of tetraisobutyl pyrophosphate, i.e. 90% of the theory.

EXAMPLE 2

500 g. of phosphorus oxychloride is added to 560 g. of isobutanol and 4 g. of boron fluoride at −5° C. in a 2-liter flask and the whole is stirred for sixty hours at −5° C. 1000 g. of water is added with slight cooling, the temperature being allowed to rise to 70° C. The whole is stirred for an hour at 80° C. and cooled and the aqueous phase is separated and washed twice, each time with 1000 g. of water. The organic phase is freed from water and excess isobutanol by distillation. The yield is 615 g. of di-isobutyl phosphate (90% of the theory) having an acid number of 248 (theoretical number 246).

The following dialkyl phosphates may be prepared in a manner analogous to that described in the preceding paragraph:

| Alcohol, parts | $POCl_3$, parts | $BF_3$, parts | Yield, percent of theory |
| --- | --- | --- | --- |
| n-Propanol (392) | 250 | 2 | di-n-propyl phosphate (65.3). |
| n-Amyl alcohol (574) | 250 | 2 | di-n-amyl phosphate (66.8). |
| n-Decanol (1,030) | 250 | 2 | di-n-decyl phosphate (98.7). |
| Methyl glycol (496) | 250 | 2 | di-methyl glycol phosphate (99). |
| Cyclohexanol (652) | 250 | 2 | dicyclohexyl phosphate (50). |
| 2-ethylhexanol (952) | 250 | 2 | di-2-ethylhexyl phosphate (62). |

I claim:
1. In a process for the production of dialkyl phosphates by reaction of phosphorus oxychloride with an alcohol and subsequent hydrolysis of the tetraalkyl pyrophosphate to the dialkyl phosphate, the improvement which comprises preparing the tetraalkyl pyrophosphate by reaction of a primary or secondary alkanol or ether alkanol respectively having 1–12 carbon atoms, a lower alkanediol, or cyclohexanol with phosphorous oxychloride in the presence of a Lewis acid at a temperature of from −30° to +10° C.

2. A process according to claim 1, which comprises reacting an alcohol as defined in claim 1 with phosphorus oxychloride in a molar ratio of 1:2 to 1:6 in the presence of a Lewis acid selected from the group consisting of aluminum chloride, iron(III) chloride, zinc chloride and boron trifluoride at a temperature of from −30° to +10° C. and subsequent hydrolysis of the tetraalkyl pyrophosphate obtained to the dialkylphosphate.

3. A process according to claim 2 which comprises reacting isobutyl alcohol with phosphorus oxychloride in the presence of boron trifluoride.

4. A process according to claim 1, wherein the alcohol reactant is isopropanol, isobutanol, or isoamyl alcohol.

References Cited
UNITED STATES PATENTS 2,552,326  5/1951  Kosolapoff _____ 260—974
2,868,827  1/1959  O'Connor et al. _____ 260—975

CHARLES B. PARKER, Primary Examiner

A. H. SUTTO, Assistant Examiner

U.S. Cl. X.R.

252—89; 260—45.95, 953, 958, 983, 988